United States Patent
Riley (10) Patent No.: US 7,952,219 B2
(45) Date of Patent: May 31, 2011

(54) HYDROELECTRIC PUMPED-STORAGE

(76) Inventor: William Riley, Captiva, FL (US)

( * ) Notice: Subject to any disclaimer, the term of this patent is extended or adjusted under 35 U.S.C. 154(b) by 0 days.

(21) Appl. No.: 12/641,931

(22) Filed: Dec. 18, 2009

(65) Prior Publication Data

US 2010/0096858 A1    Apr. 22, 2010

Related U.S. Application Data

(62) Division of application No. 11/862,975, filed on Sep. 27, 2007, now Pat. No. 7,656,050.

(51) Int. Cl.
*F03B 1/00* (2006.01)
(52) U.S. Cl. .............................. 290/54; 290/43
(58) Field of Classification Search .............. 290/54, 290/43
See application file for complete search history.

(56) References Cited

U.S. PATENT DOCUMENTS

| | | | |
|---|---|---|---|
| 818,204 A * | 4/1906 | Teilman | |
| 1,921,905 A | 8/1933 | Blom | |
| 2,110,714 A | 3/1938 | Place | |
| 2,962,599 A | 11/1960 | Pirkey | |
| 3,140,986 A * | 7/1964 | Hubbard | |
| 3,277,654 A * | 10/1966 | Shiver | |
| 3,342,267 A * | 9/1967 | Cotter et al. | |
| 3,523,192 A | 8/1970 | Lang | |
| 3,538,340 A * | 11/1970 | Lang | |
| 3,614,268 A | 10/1971 | Merenda | |
| 3,729,054 A * | 4/1973 | Yokoyama | |
| 3,736,744 A | 6/1973 | Bailey | |
| 3,751,673 A * | 8/1973 | Sprankle | |
| 3,817,038 A * | 6/1974 | Paull et al. | |
| 3,837,168 A * | 9/1974 | Alsberg et al. | 405/50 |
| 3,864,917 A * | 2/1975 | Jacoby | |
| 3,931,851 A | 1/1976 | Harris et al. | |
| 4,010,614 A | 3/1977 | Arthur | |
| 4,047,093 A | 9/1977 | Levoy | |
| 4,052,857 A * | 10/1977 | Altschuler | |
| 4,132,269 A * | 1/1979 | Chasteen | |
| 4,201,060 A * | 5/1980 | Outmans | |
| 4,248,305 A * | 2/1981 | Scarbrough et al. | |
| 4,261,419 A | 4/1981 | Probstein | |
| 4,275,310 A | 6/1981 | Summers et al. | |
| 4,282,444 A | 8/1981 | Ramer | |
| 4,284,900 A * | 8/1981 | Botts | 290/43 |
| 4,310,769 A | 1/1982 | Mazzone et al. | |

(Continued)

FOREIGN PATENT DOCUMENTS

JP    57-062976    4/1982
(Continued)

OTHER PUBLICATIONS

Martin, Gregory D., "Aquifer Underground Pumped Hydroelectric Energy Storage", University of Wisconsin-Madison, Dec. 2007.

(Continued)

*Primary Examiner* — Joseph Waks
(74) *Attorney, Agent, or Firm* — Fish & Richardson P.C.

(57) ABSTRACT

Hydroelectric pumped-storage includes monitoring electrical demand on a system over time. If the monitored demand exceeds a predetermined first value, fluid is allowed to flow substantially under the influence of gravity from a first aquifer to a second aquifer. Kinetic energy from the flowing fluid is converted into electrical energy. If the monitored demand drops below a predetermined second value, fluid from the second aquifer is moved to the first aquifer.

14 Claims, 6 Drawing Sheets

U.S. PATENT DOCUMENTS

| | | | |
|---|---|---|---|
| 4,342,196 A * | 8/1982 | Yeh | |
| 4,408,452 A | 10/1983 | Tsunoda | |
| 4,424,677 A * | 1/1984 | Lukasavage | |
| 4,443,707 A | 4/1984 | Scieri et al. | |
| 4,448,237 A | 5/1984 | Riley | |
| 4,458,492 A | 7/1984 | Ziegenhain | |
| 4,607,169 A | 8/1986 | Donnelly, Jr. | |
| 4,691,524 A | 9/1987 | Holscher | |
| 4,808,029 A * | 2/1989 | Grupping | |
| 4,824,447 A | 4/1989 | Goldsberry | |
| 5,103,914 A * | 4/1992 | LaHaye | |
| 5,148,677 A | 9/1992 | Benjamin et al. | |
| 5,389,821 A | 2/1995 | Moulliet | |
| 5,582,011 A | 12/1996 | Bronicki et al. | |
| 5,685,362 A | 11/1997 | Brown | |
| 5,713,202 A | 2/1998 | Johnson | |
| 6,000,880 A | 12/1999 | Halus | |
| 6,029,453 A * | 2/2000 | Mendive | |
| 6,051,892 A | 4/2000 | Toal | |
| 6,216,463 B1 * | 4/2001 | Stewart | 60/641.2 |
| 6,301,894 B1 * | 10/2001 | Halff | |
| 6,396,162 B1 | 5/2002 | Carrillo | |
| 6,554,074 B2 * | 4/2003 | Longbottom | |
| 7,003,955 B2 | 2/2006 | Davis | |
| 7,084,521 B1 | 8/2006 | Martin | |
| 7,281,371 B1 | 10/2007 | Heidenreich | |
| 7,320,221 B2 * | 1/2008 | Bronicki | 60/641.2 |
| 7,615,882 B2 | 11/2009 | Riley | |
| 7,753,122 B2 | 7/2010 | Curlett | |
| 2002/0009331 A1 * | 1/2002 | Carter, Jr. | 405/129.55 |
| 2002/0180215 A1 | 12/2002 | Mitchell | |
| 2003/0102676 A1 | 6/2003 | Rembert | |
| 2005/0189108 A1 * | 9/2005 | Davidson | 166/249 |
| 2006/0026961 A1 * | 2/2006 | Bronicki | 60/641.2 |
| 2007/0223999 A1 * | 9/2007 | Curlett | |
| 2007/0245729 A1 | 10/2007 | Mickleson | |
| 2008/0023963 A1 | 1/2008 | Perich | |
| 2008/0136186 A1 | 6/2008 | Gogoana et al. | |
| 2008/0253837 A1 * | 10/2008 | Miller | 405/80 |
| 2009/0085353 A1 | 4/2009 | Riley | |
| 2009/0120090 A1 | 5/2009 | DuBois | |
| 2009/0121481 A1 | 5/2009 | Riley | |
| 2009/0126923 A1 | 5/2009 | Montgomery et al. | |
| 2010/0077749 A1 | 4/2010 | Riley | |

FOREIGN PATENT DOCUMENTS

| | | |
|---|---|---|
| JP | 09 025624 A | 1/1997 |
| JP | 11-122845 A | 4/1999 |
| JP | 11-223176 | 8/1999 |
| JP | 11-223177 | 8/1999 |
| JP | 2002-146852 | 5/2002 |
| JP | 2003/172243 A | 6/2003 |
| JP | 2007-187160 | 7/2007 |
| JP | 2008-014530 | 1/2008 |
| WO | WO 9504194 A1 | 2/1995 |
| WO | WO 0196736 A1 | 12/2001 |
| WO | WO 2009/042312 | 4/2009 |
| WO | WO 2009/064630 | 5/2009 |

OTHER PUBLICATIONS

Written Opinion of the International Searching Authority and International Search Report, dated Mar. 11, 2009, from PCT application PCT/US2008/073431, which corresponds to U.S. Appl. No. 11/862,975.

International Search Report and Written Opinion of the International Searching Authority, May 29, 2009 from PCT Application No. PCT/US2008/082257.

International Search Report and Written Opinion dated May 18, 2010, corresponding to International Appln. No. PCT/US2009/058595.

Written Opinion of Intl. Search Report dated Mar. 11, 2009, corresponding to Int'l. Appln. No. PCT/US2008/073431.

International Search Report and Written Opinion dated Aug. 6, 2009, corresponding to Int'l. Appln. No. PCT/US2008/087918.

International Search Report and Written Opinion dated May 19, 2009, corresponding to Int'l. Appln. No. PCT/US2009/034627.

* cited by examiner

HYDROELECTRIC PUMPED-STORAGE

CROSS REFERENCE TO RELATED APPLICATION

This application is a divisional of and claims the benefit of priority to U.S. patent application No. 11/862,975, filed on Sep. 27, 2007, the disclosure of which is incorporated by reference herein in its entirety.

FIELD OF THE INVENTION

This disclosure relates to hydroelectric pumped-storage and, more particularly, to hydroelectric pumped-storage using one or more aquifers.

BACKGROUND

Electrical power systems generate, transmit and distribute electricity to a variety of end users.

Electrical demand refers to the amount of electricity that an electrical power system may be required to supply at a particular point in time. Electric demand on an electrical power system tends to vary over time.

SUMMARY OF THE INVENTION

In one aspect, a method includes monitoring demand on an electrical supply system. If the monitored demand exceeds a predetermined first value, fluid is allowed to flow substantially under the influence of gravity from a first aquifer to a second aquifer. Kinetic energy associated with the flowing fluid is converted into electrical energy. If the monitored demand drops below a predetermined second value, the fluid is moved from the second aquifer to the first aquifer.

Typically, the kinetic energy is converted into electrical energy by a turbine generator positioned either between the first and second aquifers or within the second aquifer. In some implementations, the turbine generator is decoupled from the second aquifer. Decoupling the turbine generator from the second aquifer may help the fluid to flow freely through the turbine generator, which is desirable to help maximize the amount of electrical energy that the turbine generator can produce.

In some implementations, the height of the turbine generator above the second aquifer is related to the permeability of the second aquifer. In general, the second aquifer's permeability can affect the rate at which the second aquifer is able to absorb the flowing fluid. Accordingly, if the second aquifer's permeability is high (i.e., it can accommodate a high rate fluid flow), then the turbine generator may be positioned closer to or within the second aquifer. Similarly, if the second aquifer's permeability is low (i.e., its ability to accommodate fluid flow is low), then it may be desirable to position the turbine generator higher in or above the second aquifer.

In a typical implementation, the turbine generator may be positioned either above, below or at the static water level of the second aquifer.

In some implementations, the electrical energy is used to at least partly satisfy the demand on the electrical supply system and to supplement the generating capacity of a primary electrical system. Fluid flow from the first aquifer to the second aquifer may be initiated by opening a valve in a fluid communication channel between the first aquifer and the second aquifer. The kinetic energy of the flowing fluid may be converted into electrical energy by causing the fluid to flow through a turbine-generator.

Typically, moving the fluid from the second aquifer to the first aquifer includes pumping the fluid. Typically, the first aquifer is at a higher elevation than the second aquifer.

In another aspect, a system includes a first aquifer, a second aquifer, one or more fluid communication channels that facilitate fluid flow between the first and second aquifers and a turbine-generator to convert kinetic energy of the flowing fluid into electrical energy.

According to some embodiments, the fluid flows through the fluid communication channels to the turbine-generator substantially under the influence of gravity. In a typical implementation, a pump moves fluid from the second aquifer to the first aquifer. In certain implementations, the pump is located in the second aquifer.

Certain embodiments include a pump and a turbine-generator housed together as a single reversible pump-turbine. Certain embodiments include a first fluid communication channel and a second fluid communication channel, where the turbine is operable to receive fluid flowing through the first fluid communication channel and the pump is operable to move fluid through the second fluid communication channel.

One or more valves may be in each of the fluid communication channels. The valves may be operable to control fluid flow through their associated channels.

In a typical implementation, the turbine-generator is operable to supply, when demand exceeds a predetermined value, electrical energy to an electrical supply system whose demand varies over time.

Some embodiments include a controller that monitors demand on an electrical supply system. If the monitored demand exceeds a predetermined first value, the fluid is allowed to flow from the first aquifer to the second aquifer and the electrical energy thereby created is used to at least partly satisfy the demand. If the monitored demand drops below a predetermined second value that is lower than the predetermined first value, the fluid is moved from the second aquifer to the first aquifer.

In a typical implementation, the first aquifer is at a higher elevation than the second aquifer. Additionally, the turbine-generator typically may be positioned a sufficient distance above the second aquifer that the second aquifer's degree of permeability does not adversely impact fluid flow through the one or more fluid communication channels to a degree that compromises operation of the turbine-generator.

The one or more fluid communication channels that facilitate fluid flow can include pipes that extend from the turbine-generator to multiple locations in the second aquifer.

In yet another aspect, a method of supplying electricity to an electric load whose demand varies over time is disclosed. The method includes supplying electricity to the electric load from an electrical supply system and monitoring the varying demand over time. If the monitored demand exceeds a first predetermined value, fluid is allowed to flow substantially under the influence of gravity from a first aquifer to a second aquifer and kinetic energy of the flowing fluid is converted into electrical energy to supplement energy from the electrical supply system. If the monitored magnitude drops below a second predetermined value, fluid is moved from the second aquifer to the first aquifer.

Typically, converting the kinetic energy of the flowing fluid into electrical energy includes directing the flowing fluid to flow through a turbine-generator. In those instances, the electrical energy typically is used to at least partly satisfy the demand.

In yet another aspect, a method includes monitoring demand on an electrical supply system. If the monitored demand exceeds a predetermined first value, enabling fluid to flow substantially under the influence of gravity from a body of fluid at an elevation above an aquifer to the aquifer and converting kinetic energy associated with the flowing fluid into electrical energy. If the monitored demand drops below a predetermined second value, moving fluid from the aquifer to the body of fluid. In some implementations, converting the kinetic energy of the flowing fluid into electrical energy comprises causing the flowing fluid to flow through a turbine-generator. The body of fluid can include a reservoir, river, stream, pond, pool or any other collection of fluid at, below or above the earth's surface.

According to another aspect, a system includes a body of fluid, an aquifer and one or more fluid communication channels that facilitate fluid flow between the body of fluid and the aquifer. A turbine-generator is arranged to convert kinetic energy of fluid flowing from the body of fluid to the second aquifer through one or more of the fluid communication channels into electrical energy. A pump can move fluid from the second aquifer to the first aquifer.

In some implementations, one or more of the following advantages are present.

For example, hydroelectric pumped-storage facilities may be created at a relatively low cost. Accordingly, the resulting pumped-storage hydroelectric energy may be provided to end users at a more affordable rate. Peak electrical demand required of an electrical power system may be satisfied in an efficient manner.

Natural resources may be utilized to store and supply electricity in an efficient manner.

Other features and advantages will be apparent from the description and drawings, and from the claims.

DETAILED DESCRIPTION

Figure 1:
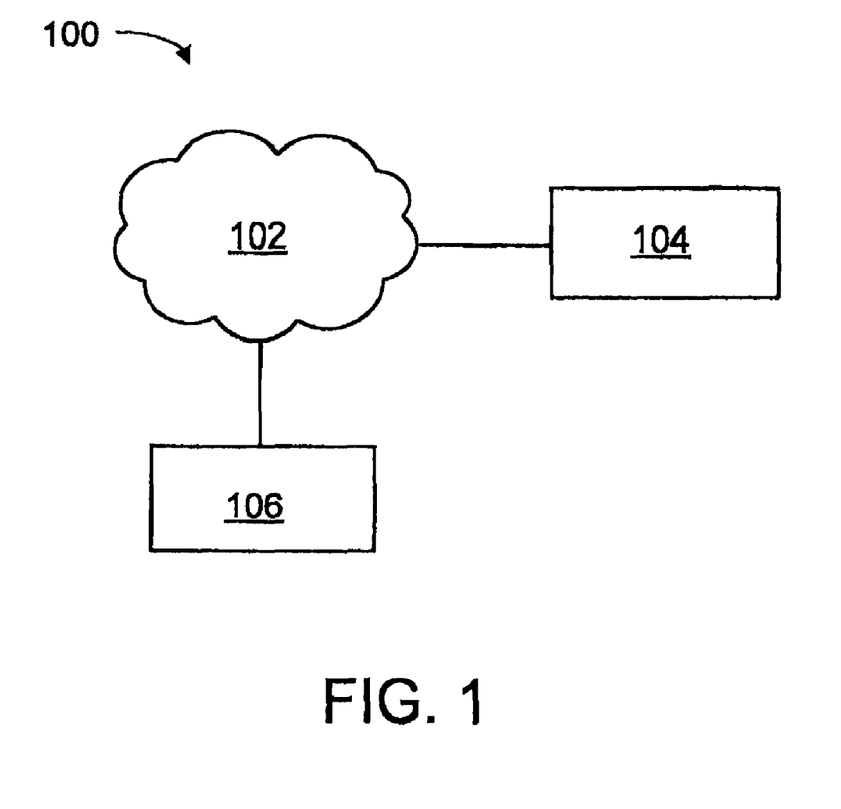
FIG. 1 is a schematic view of an electrical power system.

As illustrated in FIG. 1, the electrical power system 100 includes a primary electrical system 102 operable to supply electricity to an electrical load 104. A hydroelectric pumped-storage facility 106 is operable to store and/or to produce energy by moving fluid (e.g., water) between two or more aquifers or between an aquifer and some other body of fluid. The energy produced by the hydroelectric pumped-storage facility may be used to supplement the energy provided by the primary electrical system 102 during periods of relatively high demand.

In a typical implementation, the primary electrical system 102 includes one or more electrical generating stations, a variety of electrical transmission equipment and a variety of electrical distribution equipment. The capacity of the electrical supply system 102 to supply energy to the electrical load 104 is finite. The demand associated with the electrical load 104, however, may vary considerably over time.

When the demand on the primary electrical system 102 is relatively low, the hydroelectric pumped-storage facility 106 can use excess generating capacity of the primary electrical system 102 to move fluid from one aquifer to another aquifer (or other body of fluid) at a higher elevation. On the other hand, when demand on the primary electrical system 102 is relatively high, the hydroelectric pumped-storage facility 106 can release fluid from the higher elevation aquifer (or other body of fluid) so that it flows substantially under the influence of gravity to the lower elevation aquifer. The kinetic energy of the flowing fluid can be converted (e.g., by a turbine-generator) into electricity. That electricity may be used to supplement the finite capacity of the electrical supply system 102 and help satisfy the higher demand required by the electrical load 104.

An aquifer is an underground layer of water-bearing permeable rock or unconsolidated materials (e.g., gravel, sand, silt or clay) from which water can be extracted. An aquifer may be naturally-occurring or may be man-made. Aquifers can occur at various depths beneath the earth's surface.

Figure 2:
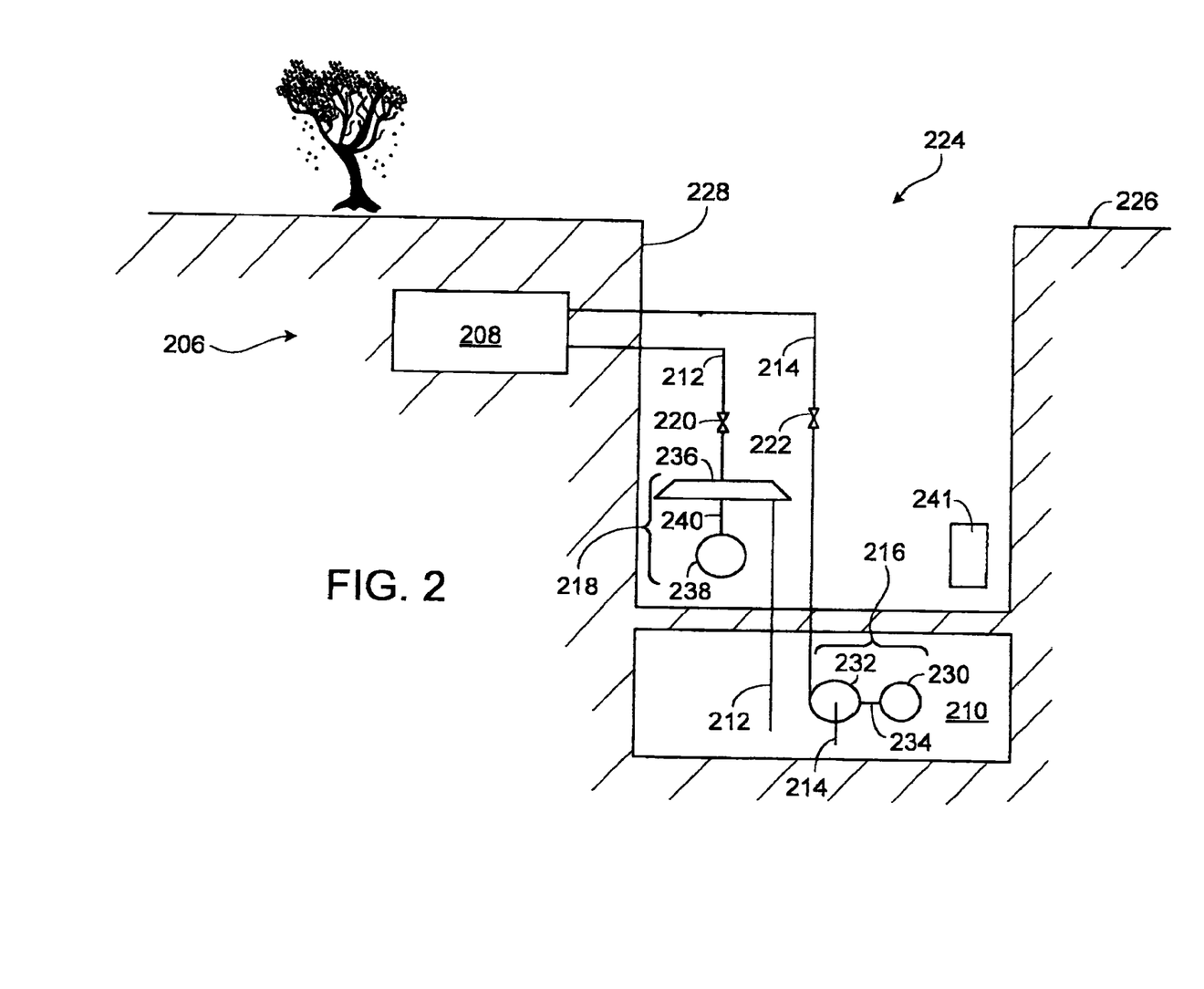
FIG. 2 is a cross-sectional view showing one implementation of a hydroelectric pumped-storage facility.

As shown in FIG. 2, hydroelectric pumped-storage facility 206 includes a first aquifer (i.e., upper aquifer 208) at a first elevation and a second aquifer (i.e., lower aquifer 210) at a second elevation lower than the first elevation. First 212 and second 214 fluid communication channels extend between the higher 208 and lower 210 aquifers. The facility 206 includes a turbine-generator 218 associated with the first fluid communication channel 212 and a pump station 216 associated with the second fluid communication channel 214. Valves 220, 222 are provided in the first 212 and second 214 fluid communication channels respectively and are operable to restrict and/or enable fluid flow through those channels. The facility 206 also includes a controller 241 that may be operable to control various aspects of the facility's 206 operations.

In the illustrated implementation, a bore hole 224 extends from the earth's surface vertically downward to a surface just above the lower aquifer 210. The bore hole 224 is formed so that one of its sidewalls 228 is adjacent the upper aquifer 208. In some implementations, the aquifer could be located some distance away from the bore hole.

The illustrated pump station 216 is positioned inside the lower aquifer 210 and includes a motor 230 coupled to a pump 232 via a shaft 234. The motor 230 provides the power to operate the pump. In some implementations, the motor 230 receives electrical energy from an external electrical source, such as the primary electrical system 102 shown in FIG. 1.

In some implementations, it is desirable that the pump 232 be located as low as possible, and preferably, well below the water line, in the lower aquifer 210. Locating the pump 232 as low as possible helps to ensure a positive pressure at the pump's 232 inlet.

In the illustrated implementation, the pump 232 is operable to move fluid from the lower aquifer 210 to the upper aquifer 208. In some implementations, the pump 230 is a rotodynamic pump (e.g., a centrifugal pump). In other implementations, however, the pump 230 is a positive displacement pump (e.g., a reciprocating pump).

The pump's 232 suction line extends through the bottom of the bore hole 224 and into the lower aquifer 210. It is generally preferable that the suction line extend almost to the bottom of the lower aquifer 210 so that the pump will be able to move fluid even if there is only a relatively small amount of fluid in the lower aquifer 210.

The pump's 232 discharge line extends generally upward from the pump 232, eventually passing through the side wall 228 of the bore hole 224 and into the upper aquifer 208. It is generally preferable that the pump's 232 discharge line enter the upper aquifer 208 at a relatively high part of the aquifer 208. If the pump's 232 discharge line enters the upper aquifer 208 above the fluid line in the upper aquifer 208, then minimal fluid may be available to flow down through the second fluid communication channel 214 when the pump is turned off.

The valve 222 coupled to the pump's 232 discharge line is operable to restrict and/or enable fluid flow through the discharge line. Typically the valve 222 will be open when the pump 232 is operating and will be closed when the pump 232 is not operating. It is generally desirable to close the valve 222 when the pump 232 is not operating so as to prevent undesirable backflow from the upper aquifer 208 to the lower aquifer 210.

In the illustrated implementation, the turbine-generator 218 is positioned inside the bore hole 208 and includes a turbine 236, and a generator 238 operatively coupled to the turbine 236 via a shaft 240.

The turbine-generator 218 is arranged so that fluid flowing from the first (i.e., upper) aquifer 208 to the second (i.e., lower) aquifer 210 flows through the turbine 236. The flowing fluid causes the turbine 236 and, therefore, the generator 238 to rotate. In general, rotation of the generator 238 enables the generator 238 to generate electricity.

Since the lower aquifer 210 has limited permeability (i.e., limited ability to accommodate fluid flowing into it), the lower aquifer 210 generally resists fluid trying to enter it, for example, from the bottom of the first fluid communication channel 212. Depending on the degree of resistance and the volume of fluid flowing through the channel, a back-up of fluid in the first fluid communication channel 212 could occur. If fluid were allowed to back-up to near the turbine 236, fluid flow through the turbine 236 might be compromised and the turbine-generator's operation might be compromised. Accordingly, in a typical implementation, the turbine-generator 218 may be positioned high enough above the lower aquifer 210 to ensure that even if some back-up fluid accumulates at the bottom of the first fluid communication channel 212, a sufficient amount of fluid flow is maintained through the turbine to ensure continued operation of the turbine 236.

In some implementations, the turbine's 236 inlet line extends through the side wall 228 of the bore hole 224 and into the upper aquifer 208. In some respects, it may be desirable for the turbine's inlet line enter the upper aquifer 208 as low as possible in the upper aquifer 208 so that a supply of fluid from the aquifer 208 is available even if there is not much fluid in the aquifer 208. On the other hand, if the turbine's 236 inlet line enters the upper aquifer 208 at a higher point in the aquifer 208, then the pressure head forcing fluid down through the turbine 236 may be greater, which also may be considered desirable. The turbine's outlet line extends through the bottom of the bore hole 224 and into the lower aquifer 210.

The valve 220 coupled to the turbine's 236 inlet line is operable to control fluid flow into the turbine 236. When the valve 220 is open, fluid is allowed to flow into the turbine 236. When the valve 220 is closed, fluid is prevented from flowing into the turbine 236.

In general, the illustrated hydroelectric pumped-storage facility 206 may operate to provide supplemental energy to a primary electrical system (e.g., primary electrical system 102 of FIG. 1) as follows. When demand on the system 102 is low (i.e., when it drops below a predetermined first value), the pump 232 begins to operate and the valve 222 in the pump outlet line opens. While operating, the pump 232 moves fluid from the lower aquifer 210 to the higher aquifer 208. In some implementations, once started, the pump 232 operates for a predetermined duration. During that time, the pump 232 typically moves fluid from the lower aquifer to the upper aquifer.

Pump 232 operation may be controlled in a number of other ways. For example, level sensors in the upper 208 and lower 210 aquifers may be used to determine when operation of pump 232 should be stopped. Alternatively, fluid pressure gages may be used to determine when operation of the pump 232 should be stopped.

Once the pump 232 is stopped, the valve 222 closes to prevent undesirable backflow of fluid through the pump 232.

When demand on the electrical supply system is high (i.e., it exceeds a predetermined second value), valve 222 may be opened to enable fluid to flow through fluid communication channel 212 substantially under the influence of gravity. The flowing fluid passes through the turbine 236 portion of the turbine-generator 218, which essentially converts the fluid's kinetic energy into electrical energy. That electrical energy may be fed from the generator 238 portion of the turbine-generator 218 into a primary electrical system to help satisfy the demand on that system.

In some implementations, the fluid continues to flow through the first fluid communication channel 212 until the demand on the electrical supply system drops below a predetermined value. If the demand does not drop below the predetermined value, then the fluid may continue to flow until there is not enough fluid left in the upper aquifer 208 to continue running the turbine-generator 218, or until the lower aquifer 210 is substantially full.

To stop the turbine-generator 218 from operating, the valve 220 can be closed, which stops the flow of fluid through the first fluid communication channel 212 and, therefore, through the turbine-generator 218. Once the flow of fluid has ceased, the turbine-generator ceases operating.

Various aspects of the facility's operations may be implemented manually or, alternatively, may be automated, for example, via the controller 241.

Figure 3:
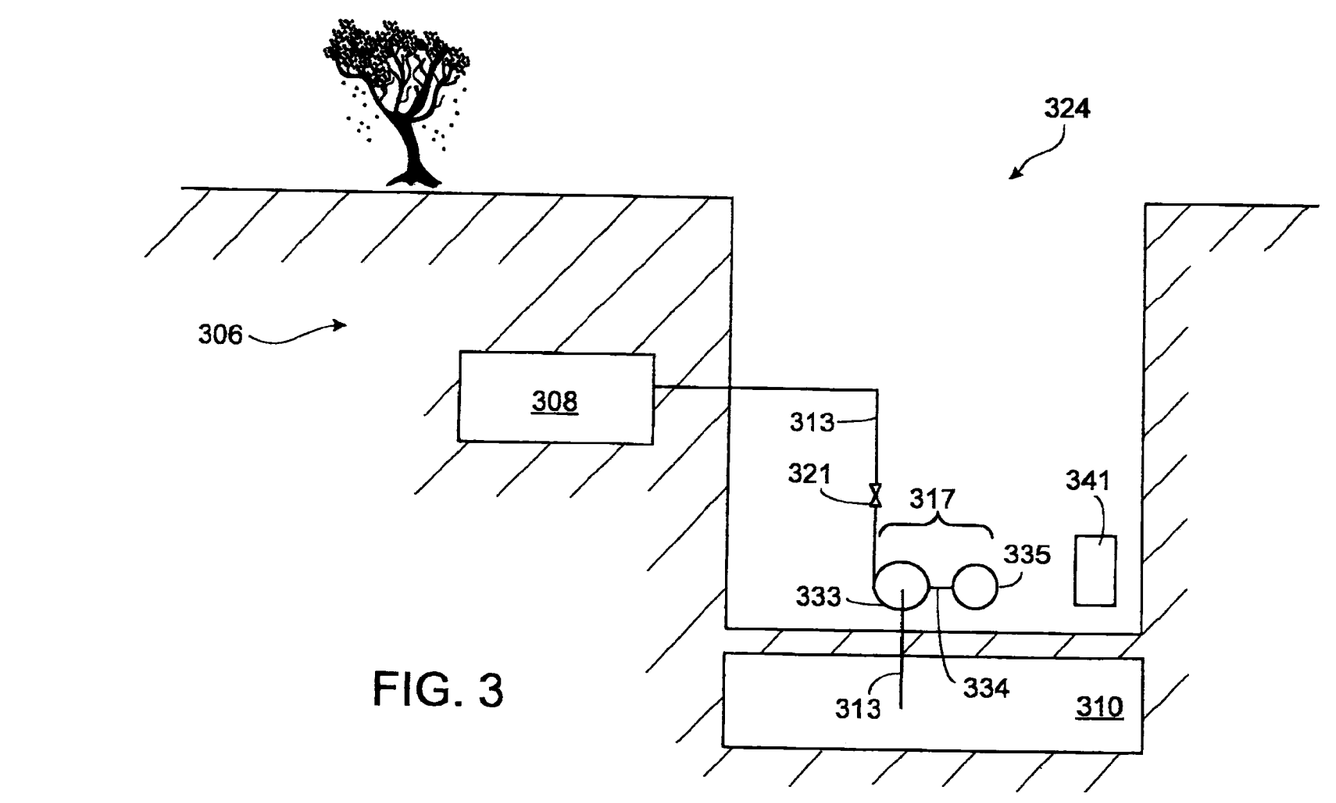
FIG. 3 is a cross-sectional view showing another implementation of a hydroelectric pumped-storage facility.

FIG. 3 illustrates another implementation of a hydroelectric pumped-storage facility 306. Other than a few differences discussed below, the illustrated facility 306 is similar to the facility 206 of FIG. 2.

The illustrated facility 306 includes an upper aquifer 308 at a first elevation and a lower aquifer 310 at a second elevation lower than the first elevation. A fluid communication channel 313 extends between the upper 308 and lower 310 aquifers. A reversible pump-turbine station 317 is associated with the fluid communication channel 313. A valve 321 is provided to restrict and/or enable fluid flow through the fluid communication channel 313. A controller 341 is provided, which is operable to control various aspects of the facility's 306 operations.

The reversible pump-turbine station 317 is positioned in the bore hole 324. The reversible pump-turbine station 317 may be positioned a sufficient height above the lower aquifer 310 to avoid problems associated with fluid back-up at the bottom of the fluid communication channel 313. The illustrated reversible pump-turbine station 317 includes a reversible pump-turbine 333 coupled to a reversible electric motor/generator 335 via a shaft 334.

The reversible pump-turbine 333 can be operated in one direction as a pump and in the other direction as a turbine. When operated as a pump, the reversible pump-turbine 333 is generally operable to move fluid from the lower aquifer 210 to the upper aquifer 208. When operated as a turbine, fluid flows from the upper aquifer 308 to the lower aquifer 310 substantially under the influence of gravity and turns the reversible pump-turbine 333.

The reversible electric motor/generator 335 can be operated as a motor to drive the pump or can be operated by the turbine as a generator to produce electricity. When the reversible electric motor/generator 335 is operated as a motor, it generally receives electrical energy from an external electrical source, such as the primary electrical system 102 shown in FIG. 1, and operates the reversible pump-turbine 333 as a pump. When the reversible electric motor/generator 335 is turned by the turbine, it acts as a generator and generates electricity.

Since the illustrated reversible pump-turbine 333 may be positioned above the static fluid line of the lower aquifer 310, some implementations include a means for priming (not shown) the reversible pump-turbine 333 may be provided. In general, the means for priming would be adapted to substantially fill the pump-turbine's casing with fluid prior to it starting to operate in pump-mode. In some implementations, the priming means is a vacuum pump or an air ejector.

In some implementations, the reversible pump-turbine may be adapted for self-priming when it begins operating in pump-mode. Alternatively, a foot or check valve may be used to retain liquid within the pump's suction line. In some implementations, a separate, submersible priming pump may be positioned in the lower aquifer and be operable to prime the reversible pump-turbine when it is going to be operated in pump-mode.

Figure 4:
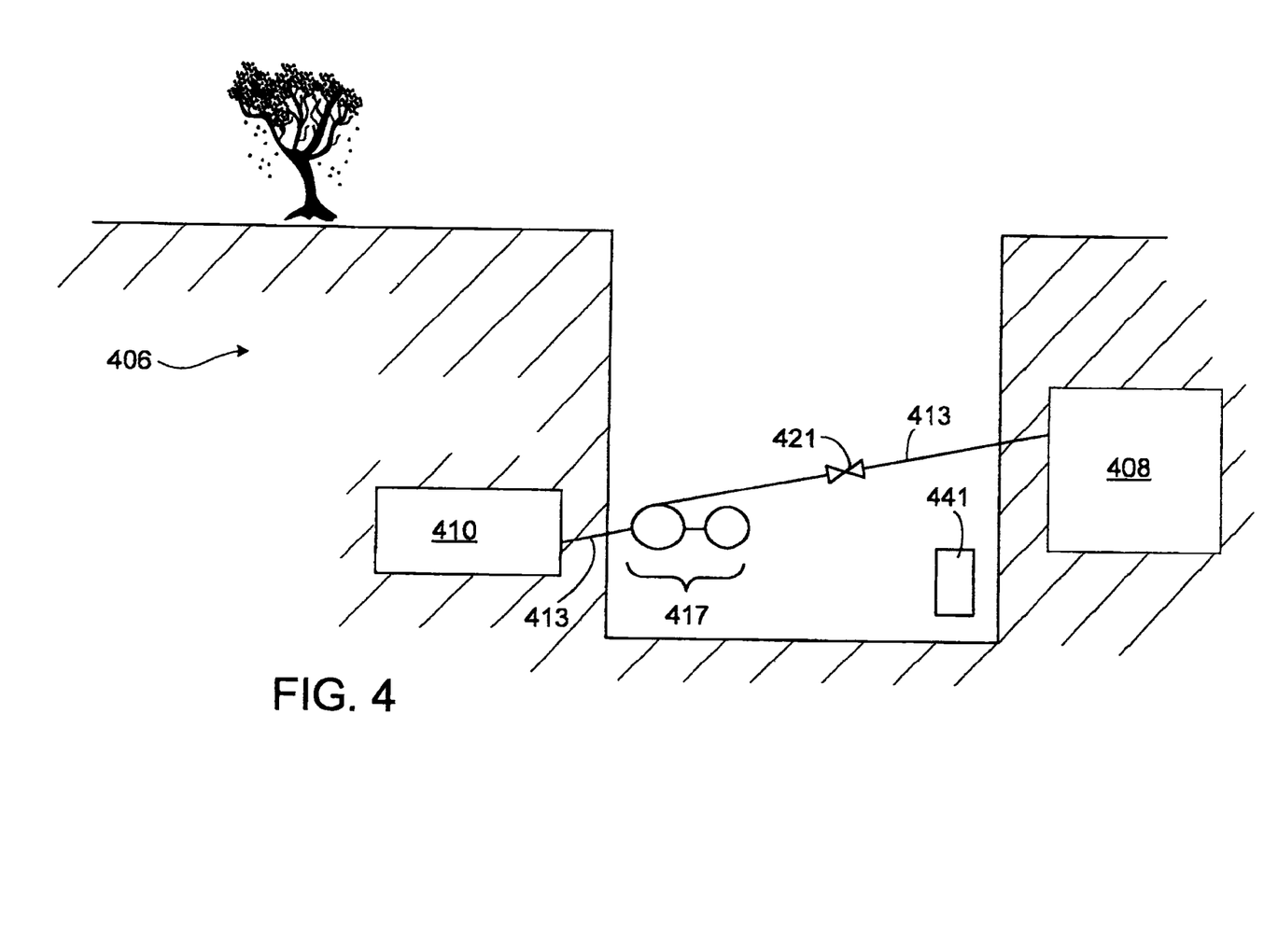
FIG. 4 is a cross-sectional view of yet another implementation of a hydroelectric pumped-storage facility.

FIG. 4 illustrates yet another implementation of a hydroelectric pumped-storage facility 406. Other than a few differences discussed below, the illustrated facility 406 is similar to the facilities 206, 306 in FIGS. 2 and 3.

The illustrated facility 406 includes a first aquifer 408 and a second aquifer 410, portions of which are at the same elevation as one another. A fluid communication channel 413 extends between an upper portion of the first aquifer 408 and a lower portion of the second aquifer 410. A reversible pump-turbine station 417 is associated with the fluid communication channel 413. A valve 421 is provided in the fluid communication channel 413 and is operable to restrict and/or enable fluid flow through the fluid communication channel 413. A controller 441 is operable to control various aspects of the facility's 406 operations.

The illustrated bore hole 424 extends from the earth's surface in a downward direction between the two aquifers 408, 410.

The fluid communication channel 413 enters the first aquifer 408 at a first elevation and enters the second aquifer 410 at a second elevation that is lower than the first elevation. The fluid communication channel 413, therefore, is angled so that fluid can flow substantially under the influence of gravity from the first aquifer 408 to the second aquifer 410 when the valve 421 is open. When fluid flows in that manner, the reversible pump-turbine station 417 is operated in turbine-mode. When, on the other hand, the reversible pump-turbine station 417 is operating in pump-mode and the valve 421 is open, fluid is moved by the pump from the second aquifer 410 to the first aquifer 408 through the fluid communication channel 413.

Figure 5:
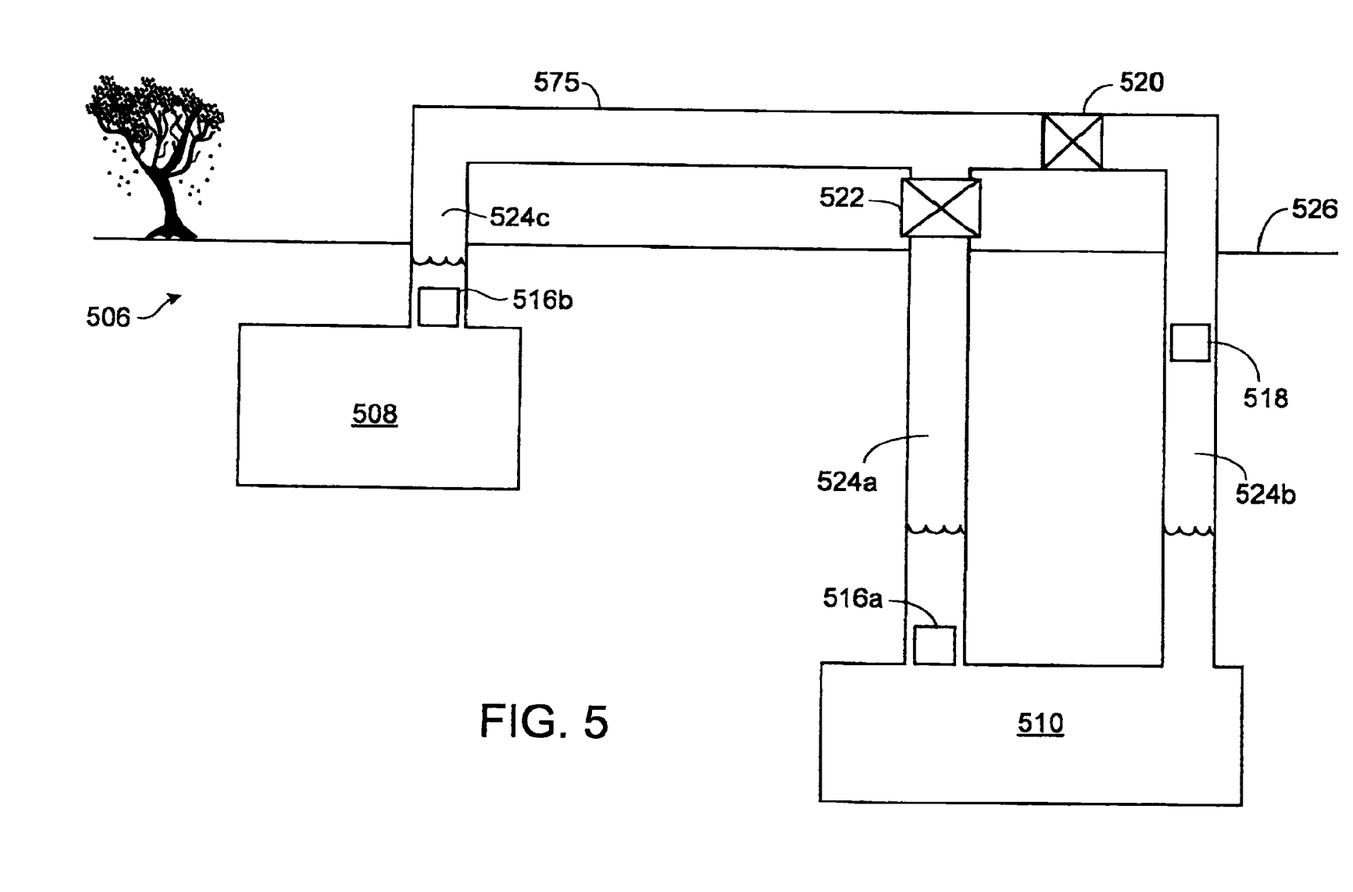
FIG. 5 is a cross-sectional view of still another implementation of a hydroelectric pumped-storage facility.

FIG. 5 illustrates yet another implementation of a hydroelectric pumped-storage facility 506. Other than a few differences discussed below, the illustrated facility 506 is similar to the facility 206 in FIG. 2.

The illustrated facility 506 includes a includes a first aquifer (i.e., upper aquifer 508) at a first elevation, a second aquifer (i.e., lower aquifer 510) at a second elevation lower than the first elevation. Fluid communication channels extend between the upper 508 and lower 510 aquifers. The fluid communication channels are defined by a pair of bore holes 524a, 524b that extend from the lower aquifer 510 to the earth's surface, a bore hole 524c that extends from the upper aquifer 508 to the earth's surface 526 and a network of pipes 575 that provide fluid communication between the bore holes 524a, 524b, 524c. The pipes include valves 520, 522.

A turbine-generator 518 is positioned inside one of the bore holes 524b that extends from the lower aquifer 510 to the earth's surface 526. In the illustrated implementation, the turbine-generator is above the static fluid line of the lower aquifer 510. However, in some implementations, the turbine-generator 518 can be at or beneath the static fluid level of the lower aquifer 510.

A first pump station 516a is positioned inside the other bore hole 524a that extends from the lower aquifer 510 to the earth's surface 526. That pump station 516a is beneath the static fluid line of the lower aquifer 510 and is operable to move fluid from the lower aquifer 510 to the upper aquifer 508. A second pump station 516b is positioned inside the bore hole 524c that extends from the upper aquifer 508 to the earth's surface 526. The second pump station 516b is beneath the static fluid line of the upper aquifer 508 and is operable to move fluid from the upper aquifer into the above-ground pipe 575 so that the fluid can flow, at least partially under the influence of gravity, down to the lower aquifer 510.

In general, the illustrated hydroelectric pumped-storage facility 506 may operate to provide supplemental energy to a primary electrical system (e.g., primary electrical system 102 of FIG. 1) as follows. When demand on the system 102 is low (i.e., when it drops below a predetermined first value), the pump 516a begins to operate and the valve 522 in the pump outlet line opens. While operating, the pump 532 moves fluid from the lower aquifer 510 to the higher aquifer 508. When the pump 532 is stopped, the valve 522 closes.

When demand on the electrical supply system is high (i.e., it exceeds a predetermined second value), valve 520 may be opened to enable fluid to flow through bore hole 524b at least partially under the influence of gravity. Pump 516b may be operated to move fluid from the upper aquifer 508 into the above-ground pipes 575. The fluid flowing through the bore hole 524b passes through the turbine-generator 518, which essentially converts the fluid's kinetic energy into electrical energy. That electrical energy may be fed from the turbine-generator 518 into the primary electrical system to help satisfy the demand on that system.

Figure 6:
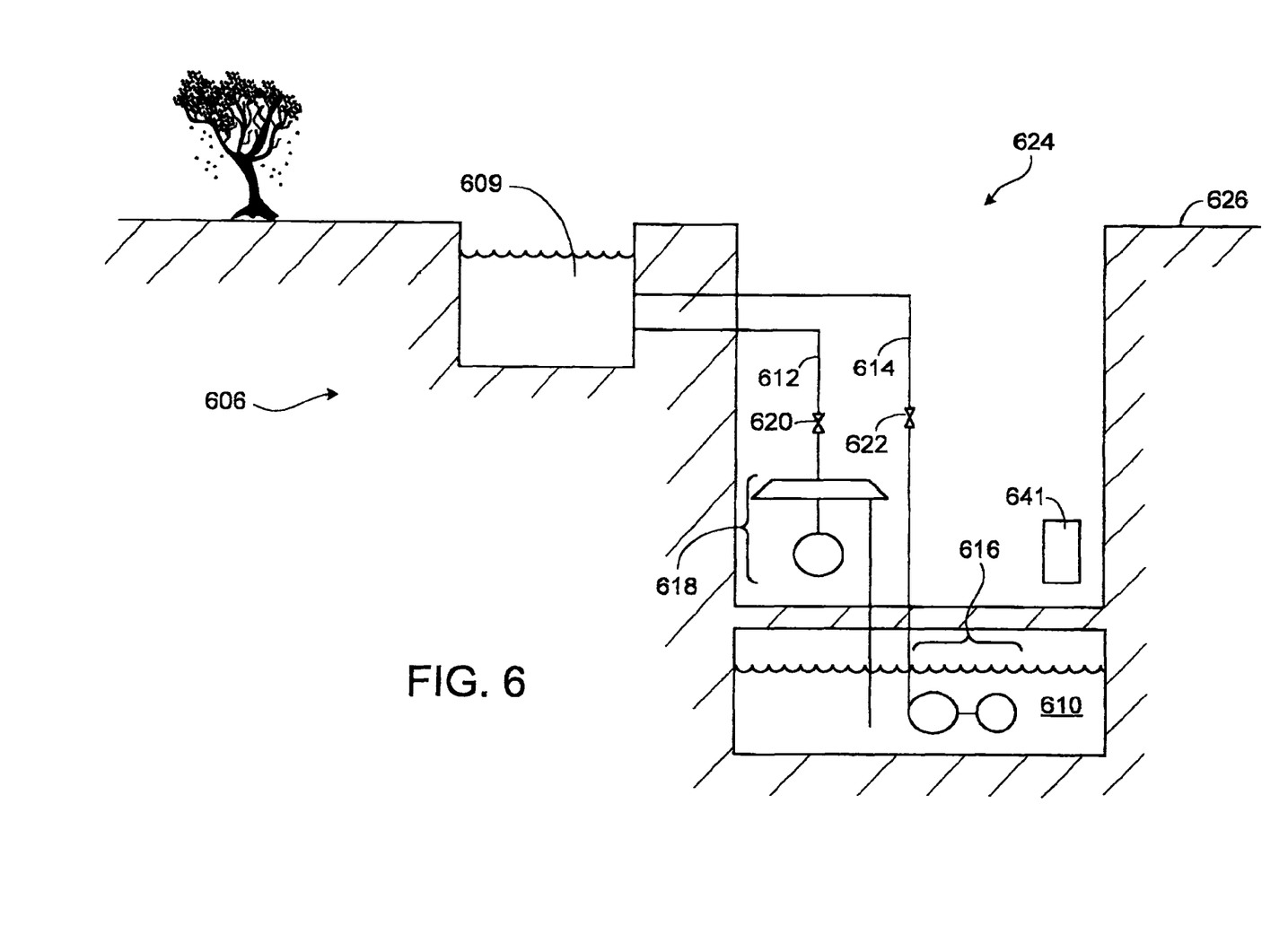
FIG. 6 is a cross-sectional view of another implementation of a hydroelectric pumped-storage facility.

FIG. 6 is yet another implementation of a hydroelectric pumped-storage facility 606. Other than a few differences discussed below, the illustrated facility 606 is similar to the facility 206 in FIG. 2.

The illustrated facility 606 includes a first source of water (e.g., reservoir 609) exposed at the earth's surface 626 and an aquifer 610 at an elevation below the earth's surface 626. First 612 and second 614 fluid communication channels extend between the reservoir 609 and the aquifer 610. The facility 606 includes a turbine-generator 618 associated with the first fluid communication channel 612 and a pump station 616 associated with the second fluid communication channel 614. Valves 620, 622 are provided in the first 612 and second 614 fluid communication channels respectively and are operable to restrict and/or enable fluid flow through those channels. The facility 606 also includes a controller 641 that may be operable to control various aspects of the facility's 606 operations. A bore hole 624 extends from the earth's surface vertically downward to a surface just above the lower aquifer 210.

Operation of the facility 606 is similar to operation of facility 206, which is discussed above.

In some implementations, the first source of water may be a lake, a river, an ocean, a stream, a man-made tank or any other source of water that may be exposed at or near the earth's surface.

A number of embodiments of the invention have been described. Nevertheless, it will be understood that various modifications may be made without departing from the spirit and scope of the invention.

For example, to help ensure that a sufficient amount of water continues to flow through the turbine, the first fluid communication channel 212 may include multiple pipes that extend from the turbine to the lower aquifer. The pipes may terminate at different locations in the aquifer so that, for example, if one of the locations becomes too saturated to continue absorbing fluid, it is likely that at least some of the other locations will be able to continue absorbing fluid. Accordingly, a sufficient amount of fluid flow through the first communication channel 212 may be sustained to ensure that the turbine-generator continues to operate.

As another example, a hydroelectric pumped storage facility may be adapted to move fluid between three or more aquifers in order to store and/or release energy.

The techniques disclosed herein can be implemented with various types of aquifers including, for example, saturated and unsaturated aquifers, as well as confined and unconfined aquifers. One or more of the aquifers can be man-made. Multiple fluid communication channels may be connected to a single turbine and/or to a single pump. That may enable a greater amount of fluid to flow between aquifers. Determining when to move fluid from one aquifer to another may be influenced by a wide variety of considerations. For example, fluid may be moved from a lower aquifer to an upper aquifer during the night and from the upper aquifer to the lower aquifer during the day.

Additionally, the bore holes that house some of the components disclosed herein can have different sizes and shapes. Some components including, for example, parts of the fluid communication channel(s) may be located above ground. Some implementations may include multiple pumps and/or multiple turbines associated with a single fluid communication channel. The valves in the fluid communication channels may be configured in a variety of ways. Multiple valves may be situated at different sections in each fluid communication channel.

Moreover, the generator can be adapted to synchronize and connect to the electrical supply system in a variety of ways. In some implementations, synchronization and connection is automated and controlled, for example, by the controller.

Accordingly, other implementations are within the scope of the claims.

What is claimed is:

1. A system comprising:
    a first aquifer;
    a second aquifer;
    one or more fluid communication channels that facilitate fluid flow between the first and second aquifers;
    a turbine-generator arranged to convert kinetic energy of fluid flowing from the first aquifer to the second aquifer through one or more of the fluid communication channels into electrical energy; and
    a pump to move fluid from the second aquifer to the first aquifer,
    wherein at least one of the first or second aquifers is a naturally-occurring underground layer of water-bearing permeable rock or unconsolidated materials.

2. The system of claim 1 wherein one or more of the fluid communication channels are adapted to enable fluid to flow to the turbine-generator substantially under the influence of gravity.

3. The system of claim 1 wherein the pump is located in the second aquifer.

4. The system of claim 1 wherein the pump and the turbine-generator are housed together in a single reversible pump-turbine.

5. The system of claim 1 wherein the one or more fluid communication channels comprises:
    a first fluid communication channel; and
    a second fluid communication channel,
    wherein the turbine is operable to receive fluid flowing through the first fluid communication channel, and
    wherein the pump is operable to move fluid through the second fluid communication channel.

6. The system of claim 1 further comprising a valve in each of the fluid communication channels.

7. The system of claim 1 wherein the turbine-generator is operable to supply, when demand exceeds a predetermined value, the electrical energy to an electrical supply system whose demand varies over time.

8. The system of claim 1 further comprising a controller operable to:
    monitor demand on an electrical supply system;
    if the monitored demand exceeds a predetermined first value:
        enable the fluid to flow from the first aquifer to the second aquifer; and
        cause the electrical energy to be used to at least partly satisfy the demand; and
    if the monitored demand drops below a predetermined second value that is lower than the predetermined first value:
        cause fluid to be moved from the second aquifer to the first aquifer.

9. The system of claim 1 wherein the first aquifer is at a higher elevation than the second aquifer.

10. The system of claim 1 wherein the turbine-generator is positioned a sufficient distance above the second aquifer that the second aquifer's permeability does not adversely impact fluid flow through the one or more fluid communication channels to a degree that compromises operation of the turbine-generator.

11. The system of claim 1 wherein the one or more fluid communication channels that facilitate fluid flow comprises:
    pipes that extend from the turbine-generator to a plurality of locations in the second aquifer.

12. The system of claim 1 wherein the second aquifer has a limited permeability and wherein the turbine-generator is positioned a sufficient distance above the second aquifer that the second aquifer's limited permeability does not adversely impact fluid flow from the first aquifer to the second aquifer.

13. A system comprising:
    a body of fluid;
    an aquifer;
    one or more fluid communication channels that facilitate fluid flow between the body of fluid and the aquifer;
    a turbine-generator arranged to convert kinetic energy of fluid flowing from the body of fluid to the second aquifer through one or more of the fluid communication channels into electrical energy; and
    a pump to move fluid from the second aquifer to the first aquifer;

wherein the aquifer is a naturally-occurring underground layer of water-bearing permeable rock or unconsolidated materials.

14. The system of claim 13 wherein the aquifer has a limited permeability and wherein the turbine-generator is positioned a sufficient distance above the aquifer that the aquifer's limited permeability does not adversely impact fluid flow from the body of fluid to the aquifer.

* * * * *